(12) United States Patent
Takada et al.

(10) Patent No.: US 9,624,879 B2
(45) Date of Patent: Apr. 18, 2017

(54) CONDENSED WATER TREATMENT DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Noriyuki Takada, Susono (JP); Takeshi Hashizume, Mishima (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/896,857

(22) PCT Filed: Jun. 28, 2013

(86) PCT No.: PCT/JP2013/067875
§ 371 (c)(1),
(2) Date: Dec. 8, 2015

(87) PCT Pub. No.: WO2014/207915
PCT Pub. Date: Dec. 31, 2014

(65) Prior Publication Data
US 2016/0153406 A1    Jun. 2, 2016

(51) Int. Cl.
*F01N 3/00*    (2006.01)
*F01N 3/10*    (2006.01)
(Continued)

(52) U.S. Cl.
CPC .............. *F02M 26/35* (2016.02); *F01N 3/005* (2013.01); *F01N 3/08* (2013.01); *F01N 3/208* (2013.01);
(Continued)

(58) Field of Classification Search
CPC .......... F01N 3/08; F01N 3/208; F01N 3/2066; F01N 3/005; F01N 2610/02;
(Continued)

(56) References Cited

U.S. PATENT DOCUMENTS 6,895,746 B2 * 5/2005 Buglass ............. B01D 53/9431
                                                        60/274
7,302,795 B2 * 12/2007 Vetrovec ................... F01N 5/02
                                                        60/274
(Continued)

FOREIGN PATENT DOCUMENTS

JP        10-318049        12/1998
JP        2010-43585       2/2010
(Continued)

*Primary Examiner* — Thomas Denion
*Assistant Examiner* — Diem Tran
(74) *Attorney, Agent, or Firm* — Finnegan, Henderson, Farabow, Garrett & Dunner, LLP

(57) ABSTRACT

The condensed water processing device determines (S2) whether the pH of condensed water stored in the condensed water tank is smaller than a threshold value (t). When the pH of condensed water is smaller than the threshold value (t), the supply quantity of urea water being supplied to the upstream side of the NOx catalyst is increased (S7) so that the supply quantity is larger than that in normal control (S4) executed when the pH of the condensed water is equal to or more than the threshold value (t).

4 Claims, 5 Drawing Sheets

(51) Int. Cl.
*F01N 3/02* (2006.01)
*F02M 26/35* (2016.01)
*F01N 3/08* (2006.01)
*F01N 3/20* (2006.01)
*F02M 26/00* (2016.01)
*F02M 26/15* (2016.01)
*F02M 26/20* (2016.01)
*F02D 41/00* (2006.01)
*F02D 41/10* (2006.01)
*F02D 41/26* (2006.01)
*F02B 37/00* (2006.01)

(52) U.S. Cl.
CPC ....... *F01N 3/2066* (2013.01); *F02D 41/0047* (2013.01); *F02D 41/107* (2013.01); *F02D 41/26* (2013.01); *F02M 26/00* (2016.02); *F02M 26/15* (2016.02); *F02M 26/20* (2016.02); *F01N 2610/02* (2013.01); *F01N 2610/146* (2013.01); *F01N 2900/0416* (2013.01); *F02B 37/00* (2013.01); *Y02T 10/24* (2013.01)

(58) Field of Classification Search
CPC ....... F01N 2610/146; F01N 2900/0416; F02B 37/00; F02D 41/0047; F02D 41/107; F02D 41/26; F02M 26/00; F02M 26/15; F02M 26/20; F02M 26/35; Y02T 10/24
USPC .......................... 60/278, 286, 295, 301, 303
See application file for complete search history.

(56) References Cited

U.S. PATENT DOCUMENTS

| | | | |
|---|---|---|---|
| 8,104,456 B2* | 1/2012 | Yacoub | F01N 13/009 123/25 A |
| 8,272,371 B2* | 9/2012 | Fasold | B01D 53/40 123/568.11 |
| 8,733,329 B2* | 5/2014 | Sailer | F02M 26/14 123/568.12 |
| 2009/0241515 A1* | 10/2009 | Cardno | F02M 26/35 60/278 |
| 2012/0240557 A1 | 9/2012 | Kawaguchi et al. | |

FOREIGN PATENT DOCUMENTS

JP 2013-124563 6/2013
WO WO-2011/070647 6/2011

* cited by examiner

CONDENSED WATER TREATMENT DEVICE FOR INTERNAL COMBUSTION ENGINE

CROSS-REFERENCE TO RELATED APPLICATIONS

This application is a national phase application of International Application No. PCT/JP2013/067875, filed Jun. 28, 2013, the content of which is incorporated herein by reference.

TECHNICAL FIELD

The present invention relates to a condensed water treatment device for an internal combustion engine, the condensed water treatment device treating condensed water generated in an EGR device.

BACKGROUND ART

As a condensed water treatment device for an internal combustion engine, known is the one which stores, in a condensed tank, condensed water generated in an EGR cooler, and injects the condensed water to an intake passage when the storage water quantity stored in the condensed water tank reaches a predetermined quantity (Patent Literature 1). The condensed water supplied to the intake passage is led into a cylinder with intake gas to vaporize. Thereby, the combustion temperature is suppressed. As a result of that, the generation quantity of NOx caused by combustion is suppressed. In addition, as another literature of prior art relating to the present invention, there is a Patent Literature 2.

CITATION LIST

Patent Literature

PTL1: JP-A-H10-318049
PTL2: JP-A-2010-43585

SUMMARY OF INVENTION

Technical Problem

Condensed water generated in an exhaust system of an internal combustion engine is acidity. Due to this, if a portion where the condensed water is supplied is metallic, there is a possibility that corrosion is generated at the supply portion of condensed water.

Then, the present invention aims to provide a condensed water treatment device for an internal combustion engine, the condensed water treatment device having ability to suppress corrosion of a supply portion of condensed water.

Solution to Problem

A condensed water treatment device for an internal combustion engine as one aspect of the present invention is a condensed water treatment device for an internal combustion engine, the condensed water treatment device being applied to the internal combustion engine comprising: a selective-reduction type NOx catalyst which is provided on an exhaust passage and reduces NOx to purify exhaust gas by ammonia; an additive supplying valve which supplies additive which is ammonia or a precursor of ammonia to the exhaust passage at an upstream side of the NOx catalyst; and an EGR device which takes out the exhaust gas from the exhaust passage at a downstream side of the NOx catalyst and leads the exhaust gas taken to an intake system as EGR gas, wherein the condensed water treatment device comprises: a condensed water tank which stores condensed water generated in the EGR device; a condensed water supplying mechanism which supplies the condensed water stored in the condensed water tank to the internal combustion engine or a related device relating to the internal combustion engine; and an additive supply controlling device which is configured to increase, in a case where pH of the condensed water stored in the condensed water tank is smaller than a threshold value, a supply quantity of the additive supplied to the exhaust passage so that the supply quantity is larger than the supply quantity of a case where the pH of the condensed water stored in the condensed water tank is equal to or more than the threshold value.

In a case where ammonia or an additive which is a precursor of ammonia is supplied to the exhaust passage at the upstream side of the selective-reduction type NOx catalyst, ammonia is held by the NOx catalyst and used for reducing NOx. On the other hand, ammonia which is not held by the NOx catalyst goes through the NOx catalyst. In a case where the EGR device takes out the exhaust gas at the downstream side of the NOx catalyst, the exhaust gas taken out by the EGR device includes ammonia which has passed through the NOx catalyst. Due to this, the ammonia dissolves in the condensed water generated in the EGR device. Accordingly, the pH of condensed water stored in the condensed water tank increases.

According to the condensed water treatment device of the present invention, in a case where the pH of condensed water stored in the condensed water tank is smaller than the threshold value, the supply quantity of the additive supplied to the exhaust passage is increased so that the supply quantity is larger than that of a case where the pH of condensed water stored in the condensed water tank is equal to or more than the threshold value. Thereby, in a case where the pH of condensed water stored in the condensed water tank is smaller than the threshold value, larger quantity of ammonia goes through the NOx catalyst and dissolves in the condensed water in comparison to a case where the pH is equal to or more than the threshold value. Due to this, as the acidity of condensed water stored in the condensed water tank is higher, the acidity of condensed water is more reduced by ammonia which has passed through the NOx catalyst. As a result of that, it is possible to avoid an excessive reduction of the pH of condensed water stored in the condensed water tank. Accordingly, it is possible to suppress corrosion of a supplied portion of the internal combustion engine or the related device to which the condensed water is supplied.

As one embodiment of the condensed water treatment device of the present invention, the additive supply controlling device may be configured to make the supply quantity of the additive smaller, as temperature of the NOx catalyst is higher. As the temperature of the NOx catalyst is higher, the quantity of ammonia which is held by the NOx catalyst becomes lower. According to this embodiment, as the temperature of the NOx catalyst is higher, less quantity of the additive is supplied. Thereby, it is possible to avoid a state that excessive quantity of ammonia goes through the NOx catalyst in time of high temperature. Thereby, it is possible to suppress an excessive increase of the pH of condensed water stored in the condensed water tank.

As one embodiment of the condensed water treatment device of the present invention, the additive supply controlling device may be configured to execute decrease offset of supply quantity of the additive in a decreasing quantity period following after acceleration of the internal combustion engine ends. In a case the acceleration of the internal combustion engine is executed, the temperature of the NOx catalyst increases whereby the holding quantity of ammonia decreases. According to this embodiment, with respect to the supply quantity of the additive, the decrease offset is executed within the decreasing quantity period following after the acceleration ends. Thereby, it is possible to avoid a state that excessive quantity of ammonia goes through the NOx catalyst after the acceleration ends. Thereby, it is possible to suppress an excessive increase of the pH of condensed water stored in the condensed water tank.

As one embodiment of the condensed water treatment device of the present invention, the additive supply controlling device may be configured to execute increase offset of supply quantity of the additive in an increasing quantity period following after deceleration of the internal combustion engine ends. In a case the deceleration of the internal combustion engine is executed, the temperature of the NOx catalyst decreases whereby the holding quantity of ammonia increases. According to this embodiment, with respect to the supply quantity of the additive, the increase offset is executed within the increasing quantity period following after the deceleration ends. Thereby, it is possible to suppress that the quantity of ammonia which goes through the NOx catalyst decreases after the deceleration ends. Thereby, it is possible to suppress that the increase of pH of condensed water stored in the condensed water tank is delayed because of the deceleration of the internal combustion engine.

One embodiment of the condensed water treatment device of the present invention may further comprise: an additive holding portion which is connected with the additive supplying valve and holds the additive; an additive supply inhibiting device which is configured to inhibit the supply of the additive, in a case where a holding quantity of the additive in the additive holding portion is equal to or less than a predetermined value; and a condensed water generating device which is configured to, in a case where the additive supply inhibiting device inhibits the supply of the additive and also the pH of condensed water stored in the condensed water tank is smaller than the threshold value, increase an inflow quantity of the EGR gas which is led to the intake system in time of such an operating state that pH of condensed water generated in the EGR device is larger than the pH of condensed water stored in the condensed water tank.

According to this embodiment, in a case where the holding quantity of the additive is equal to or less than the predetermined value, that is, the holding quantity is lacking, the supply of the additive is inhibited. Therefore, it is possible to avoid drawdown of the additive. Even in a case where the supply of additive is inhibited, in time of such an operating state that the pH of condensed water generated in the EGR device is larger than the pH of condensed water stored in the condensed water tank, the inflow quantity of EGR gas led to the intake system is increased. The inflow quantity of EGR gas is increased in such an operating state whereby it is promoted to generate condensed water showing pH larger than the pH of condensed water stored in the condensed water tank. Thereby, the condensed water stored in the condensed water tank is attenuated by the condensed water generated by the increase of the EGR quantity. As a result of that, even in a case where the holding quantity of the additive is lacking, it is possible to reduce the acidity of the condensed water stored in the condensed water tank.

The supply of condensed water to the internal combustion engine includes the supply of condensed water to various related devices mounted to the internal combustion engine, as well as the supply of condensed water to the intake system or the exhaust system in the internal combustion engine. Further, the supply of condensed water to the related device means the supply of condensed water to each of various devices which relates to the internal combustion engine but does not relate directly to combustion of the internal combustion engine.

BRIEF DESCRIPTION OF DRAWINGS

FIG. 1 is a diagram showing a whole configuration of an internal combustion engine which a condensed water treatment device according to one embodiment of the present invention is applied to.

DESCRIPTION OF EMBODIMENTS

A First Embodiment

Figure 1:
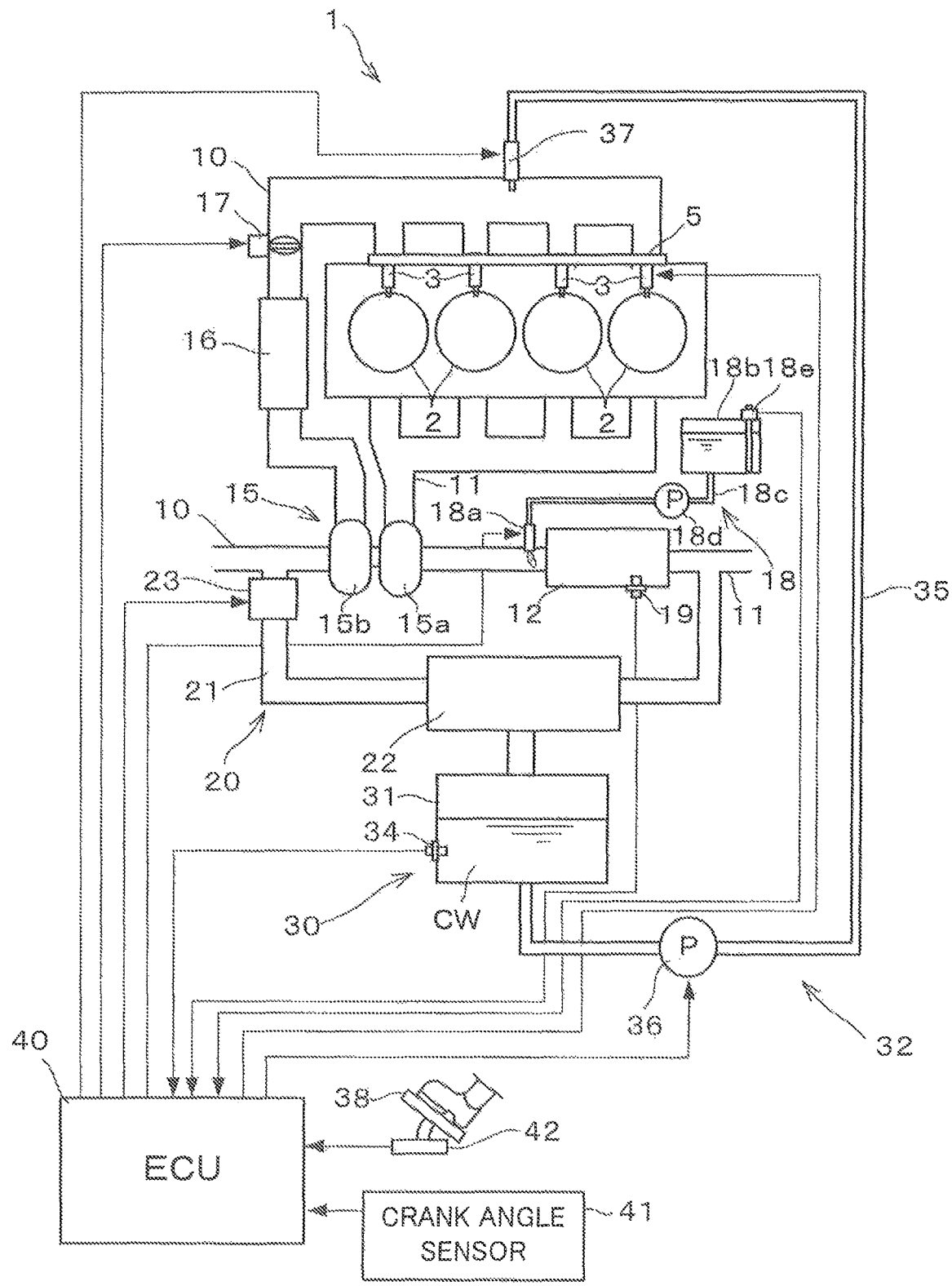

As shown in FIG. 1, an internal combustion engine 1 is configured as a four-cylinder type in line diesel engine in which four cylinders 2 are arranged along a straight line. The internal combustion engine 1 is mounted as a drive source for traveling of, for example, a car. The internal combustion engine 1 is provided, for each cylinder 2, with a fuel injection valve 3 for supplying fuel into each cylinder 2. Each fuel injection valve 3 is connected with a common rail 5 where fuel is forcibly fed, and fuel is supplied to each fuel injection valve 3 via the common rail 5. An intake passage 10 and an exhaust passage 11 are connected with each cylinder 2. Air led into the intake passage 10 is filled in each cylinder 2 at a suction stroke.

Fuel injected from the fuel injection valve 3 to the cylinder 2 is self-ignited and combusted at a compression stroke. Exhaust gas after the combustion is led into the exhaust passage 11. The exhaust gas led to the exhaust passage 11 is drained to the atmospheric air after NOx is reduced by a selective-reduction type NOx catalyst 12. At the upstream side of the NOx catalyst 12, a turbine 15a of a turbo charger 15 is provided. The intake passage 10 is provided with a compressor 15b of the turbo charger 15, an intercooler 16 cooling air pressured by the compressor 15b, and a throttle valve 17 adjusting the flow rate of intake gas.

The internal combustion engine 1 is provided with an additive supplying device 18 for supplying urea water, which is a precursor of ammonia, as an additive to the NOx catalyst 12. The additive supplying device 18 comprises: an additive supplying valve 18a which supplies urea water to the exhaust passage 11 at the upstream side of the NOx catalyst 12; a urea water tank 18b as an additive holding portion which stores urea water; a supplying passage 18c which connects the additive supplying valve 18a and the urea water tank 18b; and an electric pump 18d which pressures urea water in the supplying passage 18c. It is possible to control the supply quantity of urea water by controlling a valve opening period of the additive supplying valve 18a. The urea water tank 18b is provided with a water level sensor 18e which outputs a signal according to the storage water quantity (the water level) of urea water. When urea water is supplied at the upstream side of the NOx catalyst 12, ammonia is generated by the hydrolysis reaction, the ammonia is held by the NOx catalyst 12. The ammonia held by the NOx catalyst 12 functions as a reducing agent whereby NOx is reduced and the exhaust gas is purified. The NOx catalyst 12 is provided with a temperature sensor 19 which outputs a signal according to the temperature of the NOx catalyst 12.

The internal combustion engine 1 is provided with an EGR device 20 which executes the EGR (Exhaust Gas Recirculation) that a part of exhaust gas is recirculated to an intake system for reduction of NOx and improvement of fuel economy. The EGR device 20 comprises: an EGR passage 21 connecting the exhaust passage 11 and the intake passage 10; an EGR cooler 22 cooling the exhaust gas in the EGR passage 21; and an EGR valve 23 for adjusting the flow rate of exhaust gas to be led to the intake passage 10 (the EGR gas). The EGR passage 21 has an exhaust side end portion opening at the downstream side of the NOx catalyst 12 and an intake side end portion opening at the upstream side of the compressor 15b. As well known, the EGR cooler 22 uses cooling water in the internal combustion engine 1 as a refrigerant, and decreases the temperature of the EGR gas by heat exchange between the refrigerant and warm exhaust gas. The temperature of the EGR gas decreases whereby moisture included in the EGR gas is condensed. Due to this, condensed water is generated in the EGR cooler 22. In addition, the temperature of the EGR gas in the EGR passage 21 decreases whereby condensed water is also generated in the EGR passage 21.

The internal combustion engine 1 is provided with a condensed water treatment device 30 for collecting condensed water generated in the EGR cooler 22 and the EGR passage 21. The condensed water treatment device 30 comprises: a condensed water tank 31 which stores condensed water CW; and a condensed water supplying mechanism 32 which supplies to the intake system of the internal combustion engine 1, the condensed water CW stored in the condensed water tank 31. The condensed water tank 31 is provided with a pH sensor 34 which outputs a signal according to the pH of the condensed water CW stored. The condensed water supplying mechanism 32 has a condensed water passage 35 connecting the condensed water tank 31 and the intake passage 10. The condensed water passage 35 is provided with an electric pump 36 and an injection valve 37 which injects and supplies to the inside of the intake passage 10, the condensed water pressured by the pump 36. It is possible to control the supply quantity of condensed water by controlling a valve opening period of the injection valve 37.

The internal combustion engine 1 is provided with an engine control unit (ECU) 40 configured as a computer which controls each portion of the internal combustion engine 1. The ECU 40 executes a main motion control for controlling the fuel injection quantity and the injection timing of the internal combustion engine 1 by operating the fuel injection valve 3. The ECU 40 is also used to control of the EGR device 20 and the condensed water treatment device 30. Further, the ECU 40 operates the additive supplying valve 18a so that a state that ammonia is held by the NOx catalyst 12 is kept, whereby the ECU 40 executes continuously the supply of urea water except a special condition. A part of ammonia generated by the supply of urea water is not held by the NOx catalyst 12, but goes through the NOx catalyst 12 and dissolves in condensed water. Thereby, the pH of condensed water CW stored in the condensed water tank 31 increases. Details will be described later, but the ECU 40 controls the pH of the condensed water CW in the condensed water tank 31 by changing the supply quantity of urea water on purpose to make the quantity of ammonia going through the NOx catalyst 12 change.

Signals from a lot of sensors are inputted to the ECU 40, the sensors detecting various kinds of physical amounts for grasping the operating state of the internal combustion engine 1. For example, as sensors relating to the present invention, provided to the internal combustion engine 1 are a crank angle sensor 41 which outputs a signal according to a crank angle of the internal combustion engine 1, an accelerator opening degree sensor 42 which outputs a signal according to a depression amount of an accelerator pedal 50 provided to the internal combustion engine 1 (the accelerator opening degree), and the like. The signals outputted from those sensors are inputted to the ECU 40. Further, the signals outputted from the water level sensor 18e, the temperature sensor 19, and the pH sensor 34 are also inputted to the ECU 40 respectively.

Figure 2:
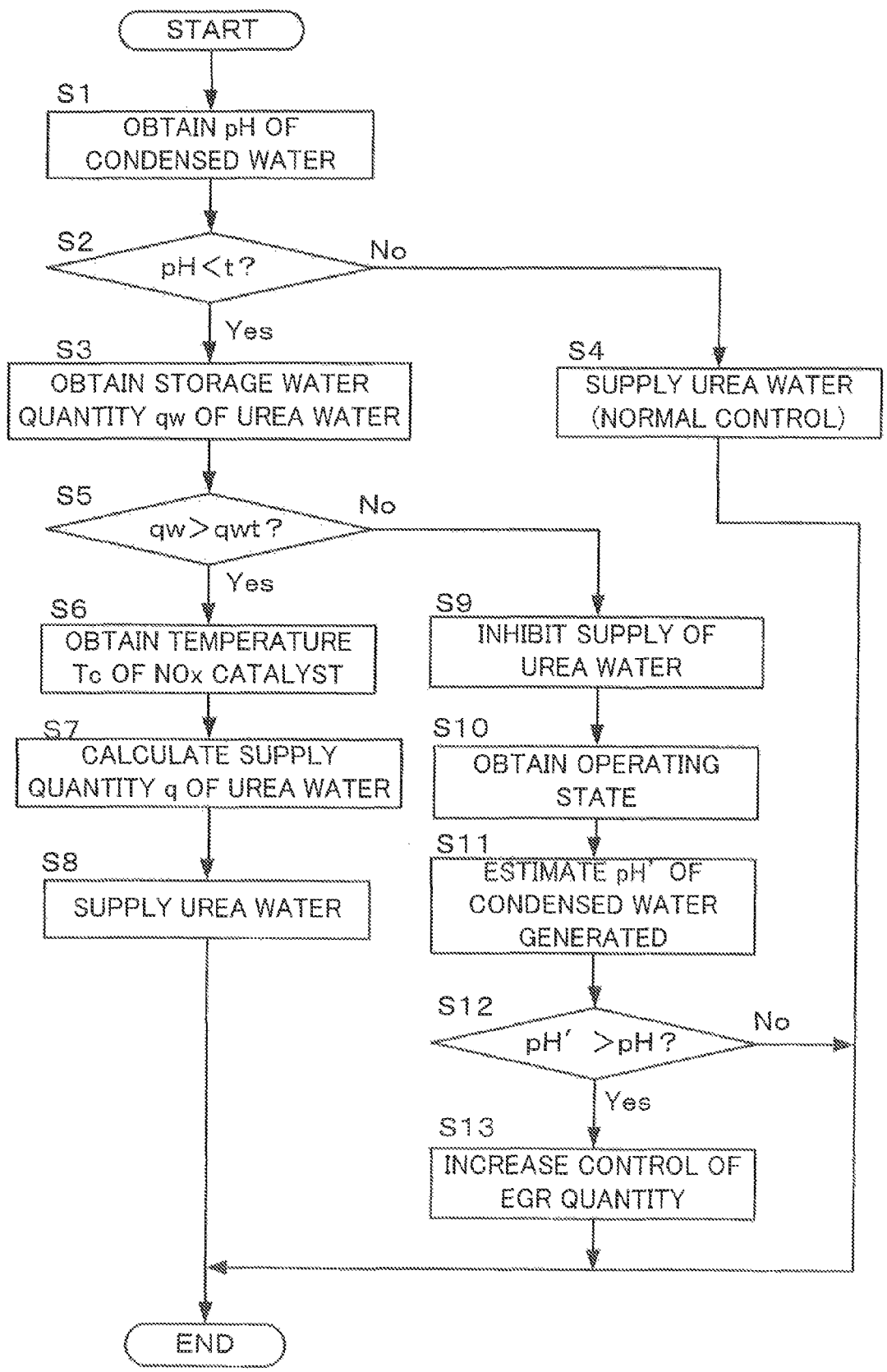
FIG. 2 is a flow chart showing one example of a control routine according to a first embodiment.

A computer program of a control routine shown in FIG. 2 is stored in the ECU 40, and read out as appropriate and executed at predetermined intervals repeatedly. In step S1, the ECU 40 obtains the pH of condensed water CW stored in the condensed water tank 31, based on the signal outputted by the pH sensor 34. In step S2, the ECU 40 determines whether the pH obtained in step S1 is smaller than a threshold value t or not. Set as this threshold value t is 4. In a case where the pH of condensed water is smaller than the threshold value t, it is determined that the condensed water stored in the condensed water tank 31 has strong acidity. In a case where the pH is smaller than the threshold value t, the ECU 40 goes to step S3. In a case where the pH is equal to or more than the threshold value t, the ECU 40 goes to step S4. In step S4, the ECU 40 executes a normal control above mentioned, where the ECU 40 supplies a predetermined supply quantity of urea water to the exhaust passage 11 to maintain the holding quantity of ammonia in the NOx catalyst 12.

In step S3, the ECU 40 refers to the signal outputted by the water level sensor 18e and obtains the storage water quantity qw of urea water stored in the urea water tank 18b.

In a case where the storage water quantity qw as the holding quantity of urea water is more than a predetermined value qwt, the ECU 40 goes to step S6. In a case where the storage water quantity qw is equal to or less than the predetermined value qwt, the ECU 40 goes to step S9. The predetermined value qwt is set as a value for determining whether urea water is insufficient or not. Accordingly, when the storage water quantity qw is more than the predetermined value qwt, this means that there is much quantity of urea water and the storage water quantity qw is sufficient. On the other hand, when the storage water quantity qw is equal to or less than the predetermined value qwt, this means that there is not much quantity of urea water and the storage water quantity qw is insufficient.

In step S6, the ECU 40 obtains the temperature Tc of the NOx catalyst 12 by referring to the signal outputted by the temperature sensor 19. In step S7, the ECU 40 calculates the supply quantity q of urea water. The supply quantity q calculated in this process is larger than the supply quantity of urea water in the normal control mentioned above. The supply quantity q is calculated so as to become larger as the pH of condensed water stored in the condensed water tank 31, which has been obtained in step S1, is smaller.

Figure 3:
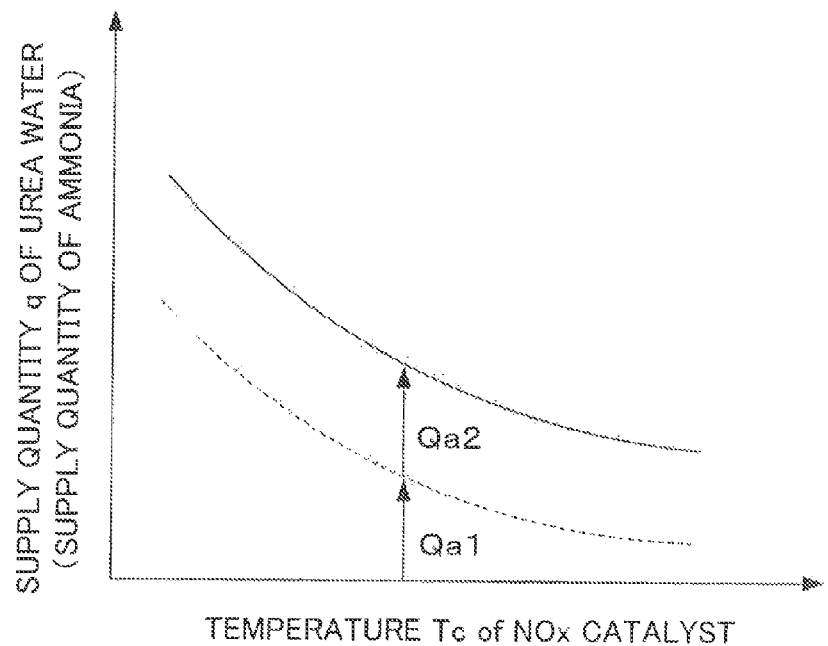
FIG. 3 is a diagram showing a relation between temperature of a NOx catalyst and supply quantity of ammonia.

As shown by a broken line in FIG. 3, the holding quantity Qa1 of ammonia held by the NOx catalyst 12 becomes smaller as the temperature Tc of the NOx catalyst 12 is higher. That is, as the temperature Tc of the NOx catalyst 12 is higher, the rate of ammonia which, not held by the NOx catalyst 12, goes through the NOx catalyst 12 becomes larger. Then, in order to suppress that the going-through quantity Qa2 of ammonia which goes through the NOx catalyst 12 increases excessively in time of high temperature, the ECU 40 calculates the supply quantity q of urea water so as to become smaller as the temperature Tc of the NOx catalyst 12 is higher, as shown by a solid line.

The supply quantity q of urea water is calculated by, for example, the following method. That is, a calculation map (not illustrated) where the mentioned characteristics are reflected is stored in the ECU 40 beforehand, the calculation map giving the supply quantity q using the pH of condensed water and the temperature Tc of the NOx catalyst 12 as variables. And then, the ECU 40 refers to this calculation map and specifies the supply quantity q corresponding to the pH obtained in step S1 and the temperature Tc obtained in step S6. Thereby, the supply quantity q is calculated in consideration of: the pH of condensed water stored in the condensed water tank 31; and the temperature Tc of the NOx catalyst 12.

In step S8, the ECU 40 operates the additive supplying valve 18a so that the urea water having the supply quantity calculated in step S7 is supplied to the exhaust passage 11. Thereby, appropriate quantity of ammonia goes through the NOx catalyst 12 and dissolves in the condensed water. Due to this, the pH of condensed water stored in the condensed tank 31 increases whereby the acidity of condensed water is reduced. The ECU 40 functions as an additive supply controlling device according to the present invention, by executing the steps S1 to S8.

In step S9, the ECU 40 inhibits the supply of urea water to the exhaust passage 11 in consideration that the storage water quantity qw of the urea water tank 18b is insufficient. Thereby, the ECU 40 functions as an additive supply inhibiting device of the present invention. In step S10, the ECU 40 obtains an engine rotational speed and a load as the operating state of the internal combustion engine 1. The engine rotational speed is obtained based on the signal outputted by the crank angle sensor 41, and the load is obtained based on the signal outputted by the accelerator opening sensor 42. In step S11, the ECU 40 estimates density of NOx in exhaust gas based on the engine rotational speed and the load which have been obtained in step S10, and estimates pH' of condensed water generated in the EGR device 20, based on the density of NOx.

In step S12, the ECU 40 determines whether the pH' of condensed water generated in the EGR device 20 is larger than the pH of condensed water stored in the condensed water tank 31 or not. In a case where the pH' of condensed water generated in the EGR device 20 is larger than the pH of condensed water stored in the condensed water tank 31, the ECU 40 goes to step S13, and otherwise, the ECU 40 skips step S13 and ends the routine of this time. In step S13, the ECU 40 executes an increase control of EGR quantity. This increase control is a control for promoting the generation of condensed water by increasing the EGR quantity so as to be larger than the EGR quantity determined based on the operating state of the internal combustion engine 1. When the EGR quantity is increased, the quantity of water vapor in exhaust gas increases. As a result of that, the generation quantity of condensed water increases. The pH' of condensed water generated by this increase control is larger than the pH of condensed water stored in the condensed water tank 31. Accordingly, the condensed water stored in the condensed water tank 31 is attenuated by the condensed water generated by the increase control whereby the acidity is reduced. The ECU 40 functions as a condensed water generating device of the present invention by executing step S13.

Figure 4:
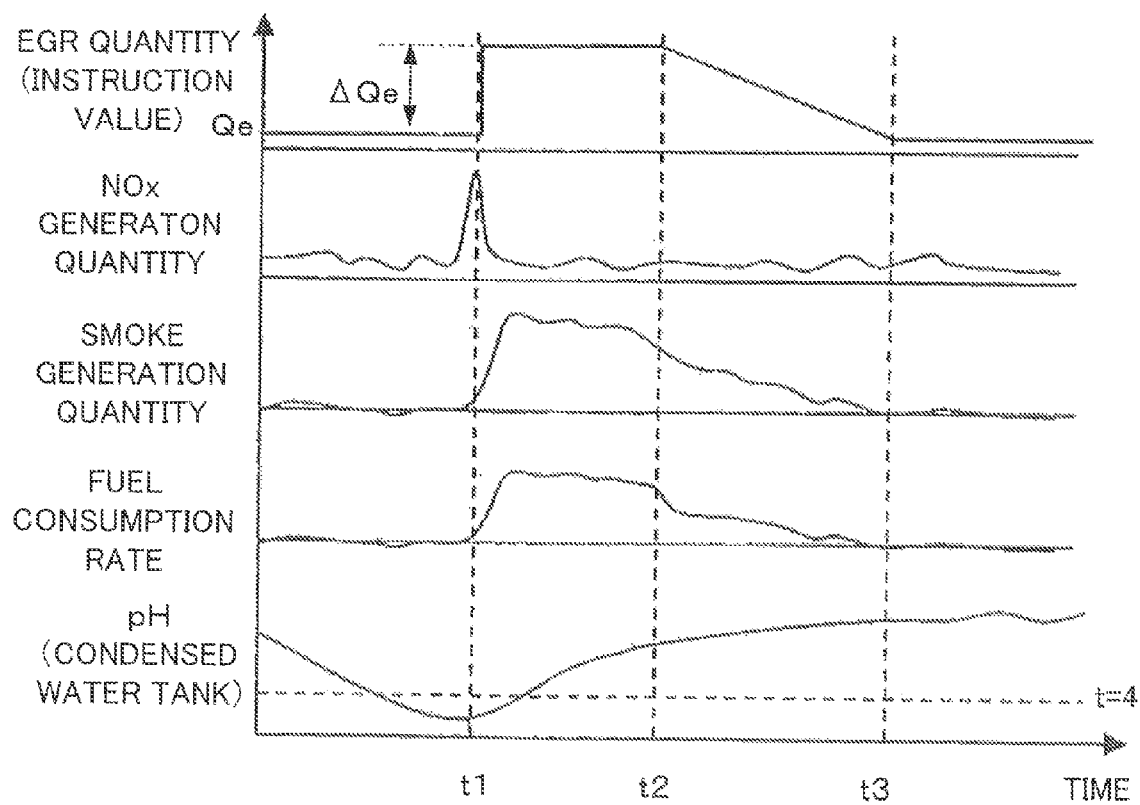
FIG. 4 is a time chart showing one example of a result of control obtained by executing an increase control of EGR quantity.

The increase control of EGR quantity will be further explained in reference to FIG. 4. The EGR quantity shown in FIG. 4 corresponds to an instruction value of the opening degree the ECU 40 gives the EGR valve 23, and does not indicate quantity of EGR gas actually led into the intake system. As shown in FIG. 4, when the ECU 40 determines that the pH of condensed water stored in the condensed water tank 31 is smaller than the threshold value t (t=4) at time t1, the ECU 40 increase the EGR quantity by ΔQe from a value Qe which is determined based on the operating state of the internal combustion engine 1. Due to this increase of EGR quantity, the NOx generation quantity, the smoke generation quantity, and the fuel consumption rate increase at the time t1. After that, since the combustion temperature decreases due to the increase of EGR quantity, the NOx generation quantity which has increased temporally turns to decline, and comes back to the almost same quantity as the NOx generation quantity showed before the increase of EGR quantity. The EGR quantity is increased at the time t1 and the EGR quantity increased is maintained until time t2 whereby the generation quantity of condensed water increases. Accordingly, the condensed water stored in the condensed water tank 31 is attenuated. Therefore, the pH of the condensed water increases, that is, the acidity is reduced.

The ECU 40 maintains the opening degree of the EGR valve 23 for the increase of EGR quantity and starts to reduce gradually the opening degree from the time t2 to reduce gradually the EGR quantity. Thereby, the smoke generation quantity and the fuel consumption rate decreases gradually. Therefore, it is possible to suppress deterioration of the smoke generation quantity and the fuel consumption rate because of a quick decrease of the EGR quantity. When the opening degree of the EGR valve 23 returns at time t3 to the opening degree showed before the increase of EGR quantity, the smoke generation quantity and the fuel consumption rate return to the ones showed before the increase of EGR quantity as well. Thereby, the pH of the condensed water stored in the condensed water tank 31 becomes an equilibrium state.

According to the first embodiment, in a case where the pH of condensed water stored in the condensed water tank 31 is smaller than the threshold value t, ammonia the quantity of which is larger than the quantity of a case where the pH is equal to or more than the threshold value t, goes through the NOx catalyst 12 and dissolves in the condensed water. Therefore, as the acidity of condensed water stored in the condensed water tank 31 is higher, the acidity of condensed water is more reduced by ammonia which has passed through the NOx catalyst 12. As a result of that, it is possible to avoid an excessive reduction of the pH of condensed water stored in the condensed water tank 31. Accordingly, it is possible to suppress corrosion of each part of the internal combustion engine 1, to which the condensed water is supplied.

Further, in a case where the storage water quantity qw of the urea water tank 18*b* is insufficient, the supply of urea water is inhibited. Therefore, it is possible to avoid drawdown of the urea water. Even in a case where the supply of urea water is inhibited, in time of such an operating state that the pH' of condensed water generated in the EGR device 20 is larger than the pH of condensed water stored in the condensed water tank 31, the EGR quantity is increased. By the condensed water generated because of the increase of the EGR quantity, condensed water stored in the condensed water tank 31 is attenuated. Thereby, even in a case where the storage water quantity qw of urea water is lacking, it is possible to increase the pH of the condensed water stored in the condensed water tank 31 to reduce the acidity of the condensed water, by the increase of the EGR quantity.

A Second Embodiment

Next, the second embodiment of the present invention will be described in reference to FIG. 5. The second embodiment is characterized by control in transition time of acceleration and can be executed along with the control of the first embodiment. Since the physical configuration of the second embodiment is the same as the one of the first embodiment, FIG. 1 is referenced with respect to the physical configuration of the second embodiment.

When the internal combustion engine 1 accelerates rapidly, the temperature of the NOx catalyst 12 increases rapidly along with increase of the exhaust gas temperature. As mentioned above, the holding quantity of ammonia of the NOx catalyst 12 becomes lower as the temperature is higher. Therefore, in a state that the temperature of the NOx catalyst 12 increases rapidly because of rapid acceleration, if the supply quantity of urea water is calculated in a similar way to that in normal time of the first embodiment, there is a possibility that ammonia goes through the NOx catalyst 12 excessively whereby the pH of condensed water stored in the condensed water tank 31 excessively increase. Then, in the second embodiment, a decrease offset of the supply quantity of urea water is executed during a certain period following rapid acceleration.

Figure 5:
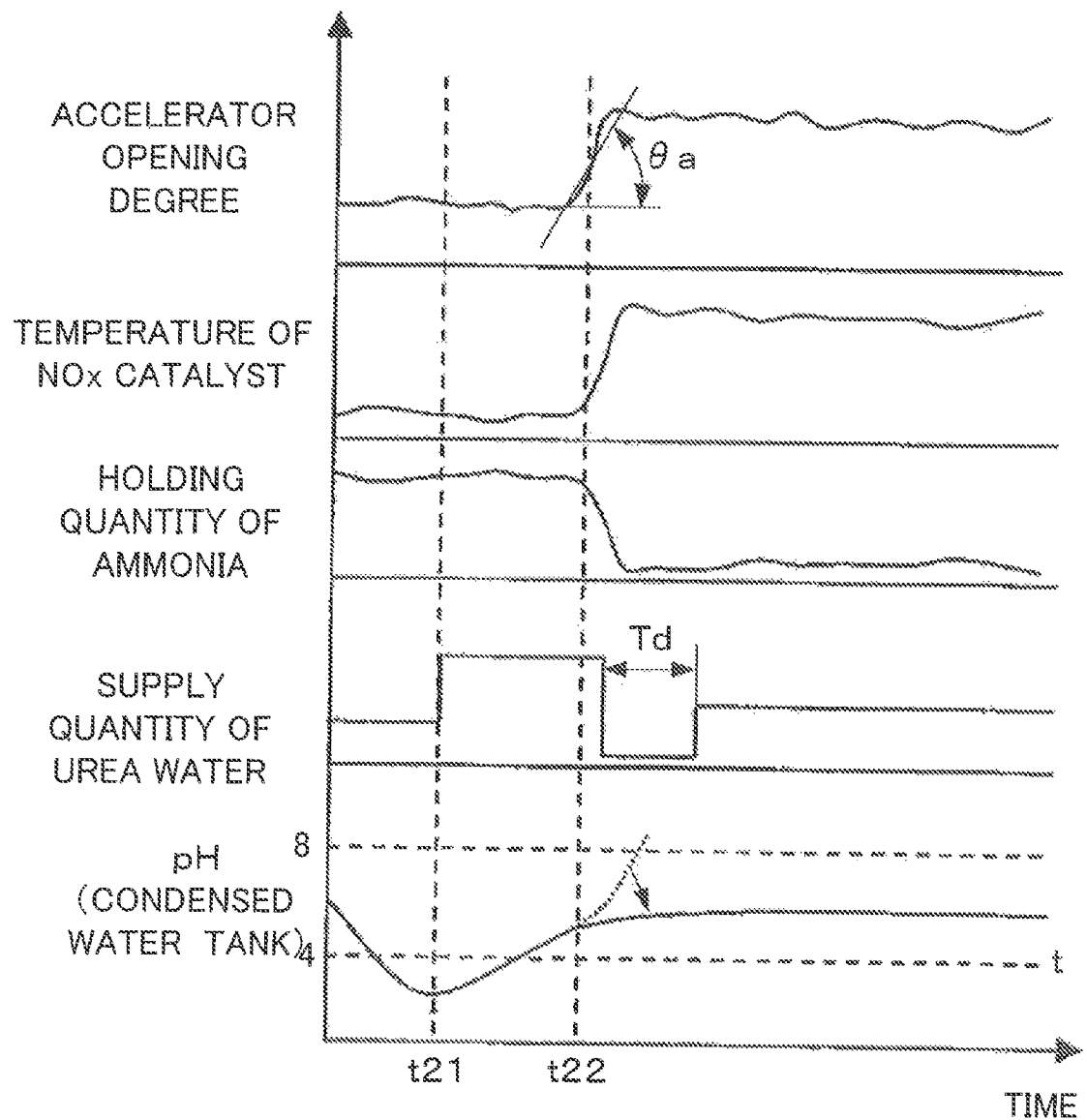
FIG. 5 is a time chart showing a control content of a second embodiment.

FIG. 5 shows temporal alternation shown by various parameters when the ECU 40 executes the control of the second embodiment along with the control of the first embodiment. As shown in FIG. 5, when determining that the pH of condensed water stored in the condensed water tank 31 is smaller than the threshold value t (t=4), the ECU 40 increases the supply quantity of urea water so that the supply quantity is larger than that of the normal time. Thereby, the pH of condensed water stored in the condensed water tank 31 increases.

In a case where a temporal alternation θa of the accelerator opening degree with respect to an increasing direction excesses a predetermined threshold value at time t22, the holding quantity of ammonia decreases along with a quick increase of the temperature of the NOx catalyst 12. This threshold value is set for determining whether the quick acceleration affects the increase of temperature of the NOx catalyst 12. The ECU 40 determines that the internal combustion engine 1 quickly accelerated at time t22, and executes the decrease offset of the supply quantity of urea water in a decreasing quantity period Td following after the acceleration ends. Thereby, it is possible to maintain the pH of the condensed water stored in the condensed water tank 31 in a neutral state. The length of the decreasing quantity period Td and the offset quantity may be determined as appropriate. Each of the length of the decreasing quantity period Td and the offset quantity may be a certain value, or be changed according to the temperature of the NOx catalyst 12.

According to the second embodiment, with respect to the supply quantity of urea water, the decrease offset is executed in the decreasing quantity period Td following after the acceleration ends whereby it is possible to suppress that the pH of condensed water stored in the condensed water tank 31 increases excessively as shown by a broken line in FIG. 5. The ECU 40 functions as the additive supply controlling device of the present invention by executing the control shown in FIG. 5.

A Third Embodiment

Next, the third embodiment of the present invention will be described in reference to FIG. 6. The third embodiment is characterized by control in transition time of deceleration and can be executed along with the control of the first embodiment. Further, the third embodiment can be also executed with the second embodiment, along with the first embodiment. Since the physical configuration of the third embodiment is the same as the one of the first embodiment, FIG. 1 is referenced with respect to the physical configuration of the third embodiment.

When the internal combustion engine 1 rapidly decelerates, the temperature of the NOx catalyst 12 decreases more gently in comparison with the degree of increase of the temperature in time of acceleration. When the temperature of the NOx catalyst 12 decreases, the holding quantity of ammonia increases. Due to this, the quantity of ammonia which goes through the NOx catalyst 12 decreases. Therefore, the amount of ammonia which dissolves in condensed water decreases whereby increase of pH of condensed water stored in the condensed water tank 31 is delayed. Then, in the third embodiment, an increase offset of the supply quantity of urea water is executed during a certain period after rapid deceleration.

Figure 6:
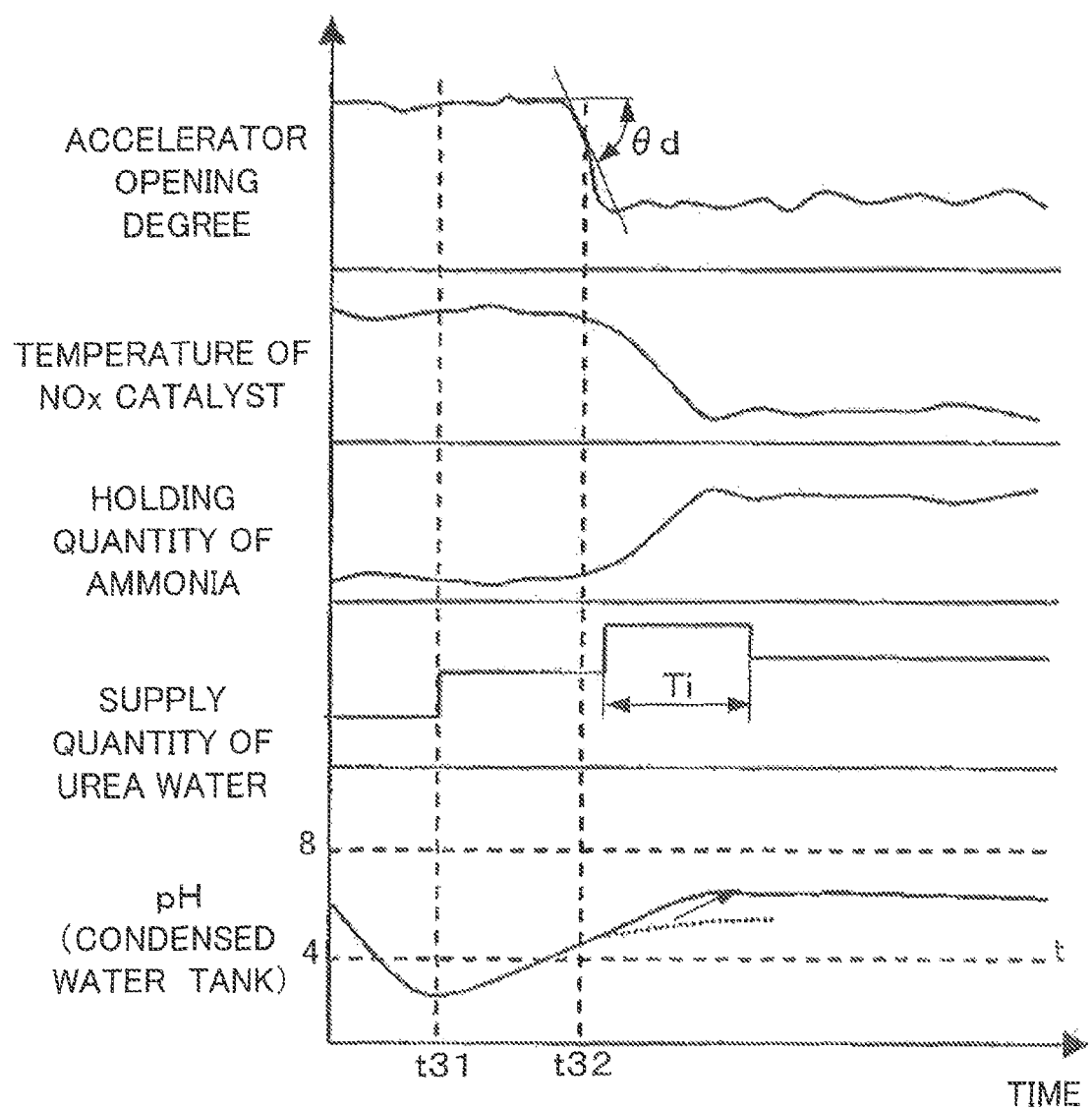
FIG. 6 is a time chart showing a control content of a third embodiment.

FIG. 6 shows temporal alternation shown by various parameters when the ECU 40 executes the control of the third embodiment along with the control of the first embodiment. When determining that the pH of condensed water stored in the condensed water tank 31 is, as shown in FIG. 6, smaller than the threshold value t (t=4) at time t31, the ECU 40 increases the supply quantity of urea water so that the supply quantity increased is larger than that of normal time, as mentioned above. Thereby, the pH of condensed water stored in the condensed water tank 31 increases.

In a case where a temporal alternation Ob of the accelerator opening degree with respect to a decreasing direction excesses a predetermined threshold value at time t32, the temperature of the NOx catalyst 12 decreases whereby the holding quantity of ammonia increases. This threshold value is set for determining whether the rapid deceleration affects the decrease of temperature of the NOx catalyst 12. The ECU 40 determines that the internal combustion engine 1 rapidly decelerated at time t32, and executes the increase offset of the supply quantity of urea water in an increasing quantity period T1 following after the deceleration ends. Thereby, it is possible to suppress decrease of the quantity of ammonia which dissolves in condensed water. The length of the increasing quantity period T1 and the offset quantity may be determined as appropriate. Each of the length of the increasing quantity period T1 and the offset quantity may be a certain value, or be changed according to the temperature of the NOx catalyst 12.

According to the third embodiment, with respect to the supply quantity of urea water, the increase offset is executed in the increasing quantity period T1 following after the deceleration ends whereby it is possible to suppress that the quantity of ammonia which goes through the NOx catalyst 12 decreases after the deceleration ends. Thereby, it is possible to suppress that increase of pH of condensed water stored in the condensed water tank 31 is delayed like a broken line, because of deceleration of the internal combustion engine 1, which is shown by a broken line. The ECU 40 functions as the additive supply controlling device of the present invention by executing the control shown in FIG. 6.

The present invention is not limited to each of the above embodiments, and can be executed in various embodiments within the subject matter of the present invention. In each above embodiment, condensed water is supplied to the intake passage 10 of the internal combustion engine 1. However, a portion which the condensed water is supplied to is not limited to the intake system of the internal combustion engine. For example, the following embodiment is also possible. The condensed water is supplied to the exhaust system, and by using a method similar to the internal EGR, the condensed water is led to a cylinder within a valve overlap period.

Further, in lieu of the above each embodiment, such an embodiment is possible that condensed water is supplied to various kinds of devices mounted to an internal combustion engine. For example, it is possible to execute the present invention in such an embodiment that condensed water is supplied to various kinds of devices, such as an inter cooler which cools air pressured by a turbo charger and an accumulator which is used for heating lubricant oil or intake gas in an internal combustion engine. Further, it is possible to supply condensed water to a related device relating to an internal combustion engine. For example, it is possible to execute the present invention in such an embodiment that condensed water is supplied to various kinds of devices such as a drive device to which torque outputted by an internal combustion engine is transmitted and an air-conditioning device using heat generated in an internal combustion engine. In a case where condensed water is supplied to such devices, it is possible to suppress corrosion of portions to which condensed water is supplied.

In each of the above embodiments, the supply quantity of urea water is calculated based on the pH of condensed water and the temperature of the NOx catalyst. However, it is not indispensable to calculate the supply quantity of urea water by using the pH of condensed water and the temperature of the NOx catalyst as parameters. Any parameters can be applied as a basis of this calculation, as long as the supply quantity of urea water is calculated so that the supply quantity of a case where the pH of condensed water stored in a condensed water tank is smaller than a threshold value is larger than the supply quantity of a case where the pH of condensed water stored in the condensed water tank is equal to or more than the threshold value. For example, it is possible to calculate the supply quantity of urea water by using any one of the pH of condensed water and the temperature of the NOx catalyst as the parameter.

In each of the above embodiments, the internal combustion engine 1 is configured as a diesel engine. However, an engine which the present invention can be applied to is not limited to a diesel engine. Accordingly, the present invention can be applied to a spark ignition type combustion engine. In addition, with respect to an engine to which the present invention can be applied, it does not matter whether a turbo charger is provided or not. Accordingly, the present invention can be applied to a natural-intake-type internal combustion engine. In a case where the present invention is applied to the natural-intake-type internal combustion engine, since condensed water can be supplied to an intake system by using negative pressure in an intake passage, it is possible to omit a pump for pressuring condensed water, the pump being provided in each above embodiment.

In each of the above embodiments, urea water which is a precursor of ammonia is supplied to the NOx catalyst. However, in lieu of the above embodiments, such an embodiment is possible that ammonia in a state of a gaseous body or a liquid body is supplied to the NOx catalyst as an additive.

The invention claimed is:

1. A condensed water treatment device for an internal combustion engine, the condensed water treatment device being applied to the internal combustion engine comprising:
    a selective-reduction NOx catalyst which is provided on an exhaust passage and reduces NOx to purify exhaust gas by ammonia;
    an additive supplying valve which supplies additive which is ammonia or a precursor of ammonia to the exhaust passage at an upstream side of the selective-reduction NOx catalyst; and
    an EGR device which is provided with an EGR cooler where condensed water is generated, an EGR passage where the exhaust gas taken out from the exhaust passage at a downstream side of the selective-reduction NOx catalyst leads to an intake system as EGR gas, and an EGR valve to adjust flow rate of the exhaust gas to be led to the intake system, wherein
    the condensed water treatment device comprises:
    a condensed water tank which stores condensed water generated in the EGR device;
    a condensed water supplying mechanism which is provided with a condensed water passage connecting the condensed water tank and the intake system or an exhaust system to supply the condensed water stored in the condensed water tank to the internal combustion engine or a related device relating to the internal combustion engine; and
    a computer which functions by executing a computer program as an additive supply controlling device which is configured to control the additive supplying valve to increase, in a case where pH of the condensed water stored in the condensed water tank is smaller than a threshold value, a supply quantity of the additive supplied to the exhaust passage so that the supply quantity is larger than the supply quantity of a case where the pH of the condensed water stored in the condensed water tank is equal to or more than the threshold value, wherein
    the additive supply controlling device is further configured to control the additive supplying valve to execute decrease offset of supply quantity of the additive in a decreasing quantity period following after acceleration of the internal combustion engine ends.

2. The condensed water treatment device according to claim 1, wherein
    the additive supply controlling device, as which the computer functions by executing the computer program, is configured to control the additive supplying valve to make the supply quantity of the additive smaller, as temperature of the selective-reduction NOx catalyst is higher.

3. The condensed water treatment device according to claim 1, wherein the additive supply controlling device, as which the computer functions by executing the computer program, is configured to control the additive supplying valve to execute increase offset of supply quantity of the additive in an increasing quantity period following after deceleration of the internal combustion engine ends.

4. The condensed water treatment device according to claim 1, further comprising:

an additive holding portion which is connected with the additive supplying valve and holds the additive, wherein the computer further functions by executing the computer program as:

an additive supply inhibiting device which is configured to control the additive supplying valve to inhibit the supply of the additive, in a case where a holding quantity of the additive in the additive holding portion is equal to or less than a predetermined value; and a condensed water generating device which is configured to control the EGR valve, in a case where the additive supply inhibiting device inhibits the supply of the additive and also the pH of condensed water stored in the condensed water tank is smaller than the threshold value, to increase an inflow quantity of the EGR gas which is led to the intake system in time of such an operating state that pH of condensed water generated in the EGR device is larger than the pH of condensed water stored in the condensed water tank.

* * * * *